(12) United States Patent
Miyazaki

(10) Patent No.: US 7,664,919 B2
(45) Date of Patent: Feb. 16, 2010

(54) CACHE SYSTEM

(75) Inventor: Hiroshi Miyazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 225 days.

(21) Appl. No.: 11/445,756

(22) Filed: Jun. 2, 2006

(65) Prior Publication Data

US 2007/0016717 A1 Jan. 18, 2007

(30) Foreign Application Priority Data

Jul. 13, 2005 (JP) ............................. 2005-204679

(51) Int. Cl.
*G06F 12/02* (2006.01)
(52) U.S. Cl. ..................... 711/133; 711/144; 711/145
(58) Field of Classification Search ................ 711/133, 711/144, 145
See application file for complete search history.

(56) References Cited

U.S. PATENT DOCUMENTS

| | | | |
|---|---|---|---|
| 6,122,729 A | 9/2000 | Tran | |
| 6,734,867 B1 * | 5/2004 | Munshi et al. | 345/557 |
| 2002/0069333 A1 * | 6/2002 | Ghosh et al. | 711/146 |
| 2005/0278499 A1 * | 12/2005 | Durham et al. | 711/173 |

OTHER PUBLICATIONS

Jim Handy, "The Cache Memory Book", 1998, Academic Press Inc., 2nd Edition, pp. 8-14.*
Hennessy and Patterson, "Computer Architecture a Quantitative Approach, $2^{nd}$ Ed.", pp. 400-402, and 411-422, 1996.

* cited by examiner

*Primary Examiner*—Sanjiv Shah
*Assistant Examiner*—Jae U Yu
(74) *Attorney, Agent, or Firm*—Spinkle IP Law Group

(57) ABSTRACT

A cache system includes a data storage which stores the data, which a memory supplies, in memory regions that are identified by identification numbers. A management data storage stores a relation between the identification numbers and the addresses of data items stored or being stored in the data storage and stores validation information indicating whether the data storage stores the data items. A refill-processing unit designates a memory region in which the data of a new address supplied from a processor is to be stored and requests the memory to output the data of the new address. An inspection unit receives the identification number of the memory region designated, determines whether the validation information about the identification number of the memory region designated is valid, and requests the data storage to output the data stored in the memory region designated when the validation information is valid.

4 Claims, 4 Drawing Sheets

| ID number | Valid | Read address |
|---|---|---|
| 0 | 1 | 0X000000 |
| 1 | 1 | 0X000001 |
| 2 | 1 | 0X000002 |
| 3 | 0 | — |
| | | |
| n | 1 | 0X000003 |

| ID number | Valid | Read address |
|---|---|---|
| 0 | 1 | 0X000000 |
| 1 | 1 | 0X000001 |
| 2 | 1 | 0X000002 |
| 3 | 0 | — |
| | | |
| n | 1 | 0X000003 |

FIG. 3

CACHE SYSTEM

CROSS-REFERENCE TO RELATED APPLICATIONS

This application is based upon and claims the benefit of priority from prior Japanese Patent Application No. 2005-204679, filed Jul. 13, 2005, the entire contents of which are incorporated herein by reference.

BACKGROUND OF THE INVENTION

1. Field of the Invention

The present invention relates to a cache system to be provided between a processor and a memory device.

2. Description of the Related Art

Unlike ordinary processors, any processor that processes streams, such as 3D-graphics large-scale integration (LSI) processor, performs no branching. Therefore, the pipeline process would not be disturbed.

In most cases where such an LSI processor refers to the data stored in a memory, it first pre-fetches desired data from the memory and then fetches the data from the memory after the data is filled in a cache system by virtue of the pre-fetching. The latency of the memory is thereby concealed.

The cache system needs to have a complicated circuit for determining hits in pre-fetching desired data and fetching the data, as will be described below.

First, the processor such as an LSI (requester) supplies a read address to a tag unit and the FIFO memory unit, both provided in the cache system. The tag unit is constituted by a table stored in the memory. It holds the address at which the data is stored in a cache-data storage unit and the addresses at which data items are stored in the memory. The determining unit of the cache system refers to the tag unit, determining whether a cache-data storage unit contains the data of the address read from processor (it determines whether a hit has been made). This operation is called "pre-fetching."

If the data of the address is not stored in the cache-data storage unit, a signal indicating this fact is supplied to the refill-processing unit of the cache system. On receiving the signal, the refill-processing unit outputs a read address and a refill request to the memory. In response to the refill request, the memory supplies the data of the read address to the cache-data storage unit (it performs refilling).

Upon lapse of a predetermined time, an FIFO memory unit supplies the read address to the determining unit. The determining unit determines again whether or not a hit has been made. This operation is called "fetching." If the cache-data storage unit stores the data of the read address, this data is supplied to the requester.

As indicated above, the determining unit determines whether a hit has been made, in the pre-fetching and the fetching. Therefore, the determining unit must have a circuit configuration that can perform hit-determination in both the pre-fetching and the fetching. The determining unit inevitably has a large area. A number of request are made to the cache system, particularly in 3D-graphics processes. To cope with this, the determining unit has a very large area.

BRIEF SUMMARY OF THE INVENTION

According to a first aspect of the present invention, there is provided a cache system that acquires data of an address requested by a processor from a memory, temporarily stores the data and supplies the data to the processor, the cache system comprising: a data storage which stores the data, which the memory supplies, in memory regions that are uniquely identified by identification numbers; a management data storage which stores a relation between the identification numbers and the addresses of data items stored or being stored in the data storage and stores validation information indicating whether the data items are stored in the data storage; a refill-processing unit which designates from the memory regions a memory region in which the data of a new address supplied from the processor is to be stored and requesting to the memory to output the data of the new address; and an inspection unit which receives the identification number of the memory region designated, determines whether the validation information about the identification number of the memory region designated is valid, and requesting the data storage to output the data stored in the memory region designated when the validation information is valid.

BRIEF DESCRIPTION OF THE SEVERAL VIEWS OF THE DRAWING

FIG. 3 is a diagram representing the configuration of the tag unit provided in the cache system according to the embodiment.

DETAILED DESCRIPTION OF THE INVENTION

Figure 1:
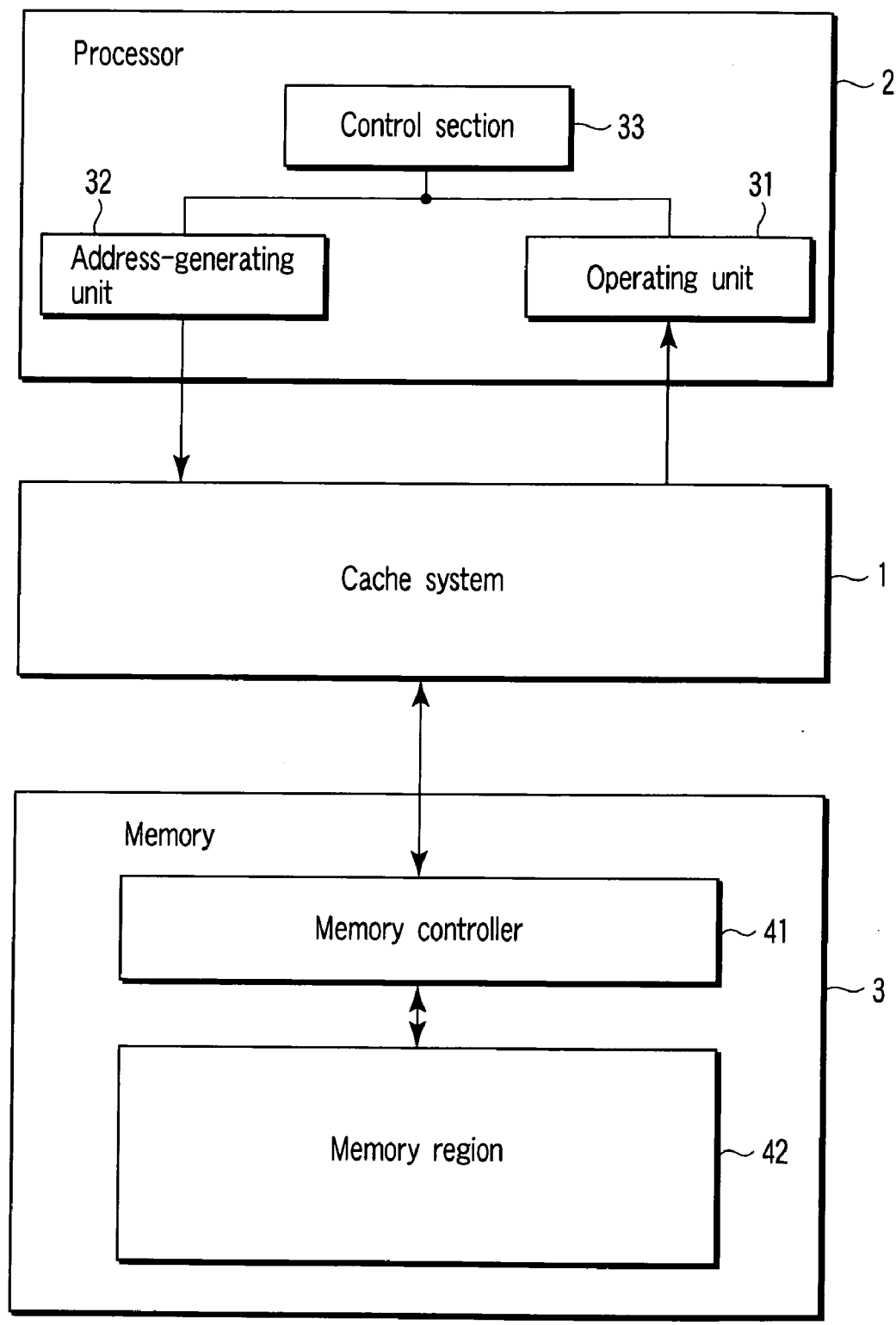
FIG. 1 is a block diagram showing a cache system according to an embodiment of this invention and the peripheries to the system.

An embodiment of this invention will be described, with reference to the accompanying drawings. In the description that follows, the components that are substantially identical in function and structure will be designated at the same reference numerals and will be repeatedly described only if necessary.

FIG. 1 is a block diagram showing a cache system 1 (storage device) according to an embodiment of this invention and the peripheries to the system. As FIG. 1 depicts, the cache system 1 is provided between a processor 2 and a main memory 3.

The main memory 3 is, for example, a volatile memory such as a random access memory (RAM). The main memory 3 holds a control program and data that the processor 2 needs to perform its function. The control program and the data have been read from, for example, a hard disk drive (not shown) and stored into the main memory 3.

The processor 2 is, for example, a 3D-graphics LSI. It can perform, for example, the pipeline process. The processor 2 reads the control program from the main memory 3 and carries out prescribed processes in accordance with the program. In practice, the control program read from the main memory 3 is read into the cache system 1, and the processor 2 reads the control program from the cache system 1 and performs processes in accordance with the control program.

The processor 2 comprises, for example, an operating unit 31, an address-generating unit 32, and a control unit 33. The operating unit 31, address-generating unit 32 and control unit 33 are connected to one another by, for example, a bus. Thus, they can communicate with one another.

The control unit 33 controls the other components of the processor 2. The operating unit 31 performs predetermined processes in accordance with the control program read from the main memory 3 and supplied via the cache system 1. More precisely, the operating unit 31 carries out the pipeline process, supplying an instruction to the address-generating unit 32. The instruction instructs that the control program and the data, both required later, be read from the main memory 3 to the cache system 1. The operating unit 31 may comprise, for example, a plurality of signal-processing units.

The address-generating unit 32 outputs an address signal that contains the information about the address in the main memory, at which the control program and data that the operating unit 31 requests for. The address signal is supplied to the cache system 1.

As will be described later, the cache system 1 can store the control program and data that have been read from the main memory 3 in accordance with the address signal. If the cache system 1 does not store the control program or the data, which are designated by the address signal, it outputs a signal to the main memory 3, demanding that the main memory 3 should output the data designated by the address signal.

If the cache system 1 stores the control program or the data, which are designated by the address signal, it does nothing for a predetermined time. Upon lapse of the predetermined time, the cache system 1 supplies the control program and the data to the operating unit 31.

The main memory 3 has, for example, a memory controller 41 and a memory region 42. The memory controller 41 controls the other components of the main memory 3. The memory controller 41 receives addresses externally supplied. It can read and write data designated by any address, from and into the memory region 42. The memory controller 41 can receive and output signals and data from and to devices provided outside the main memory 3.

Figure 2:
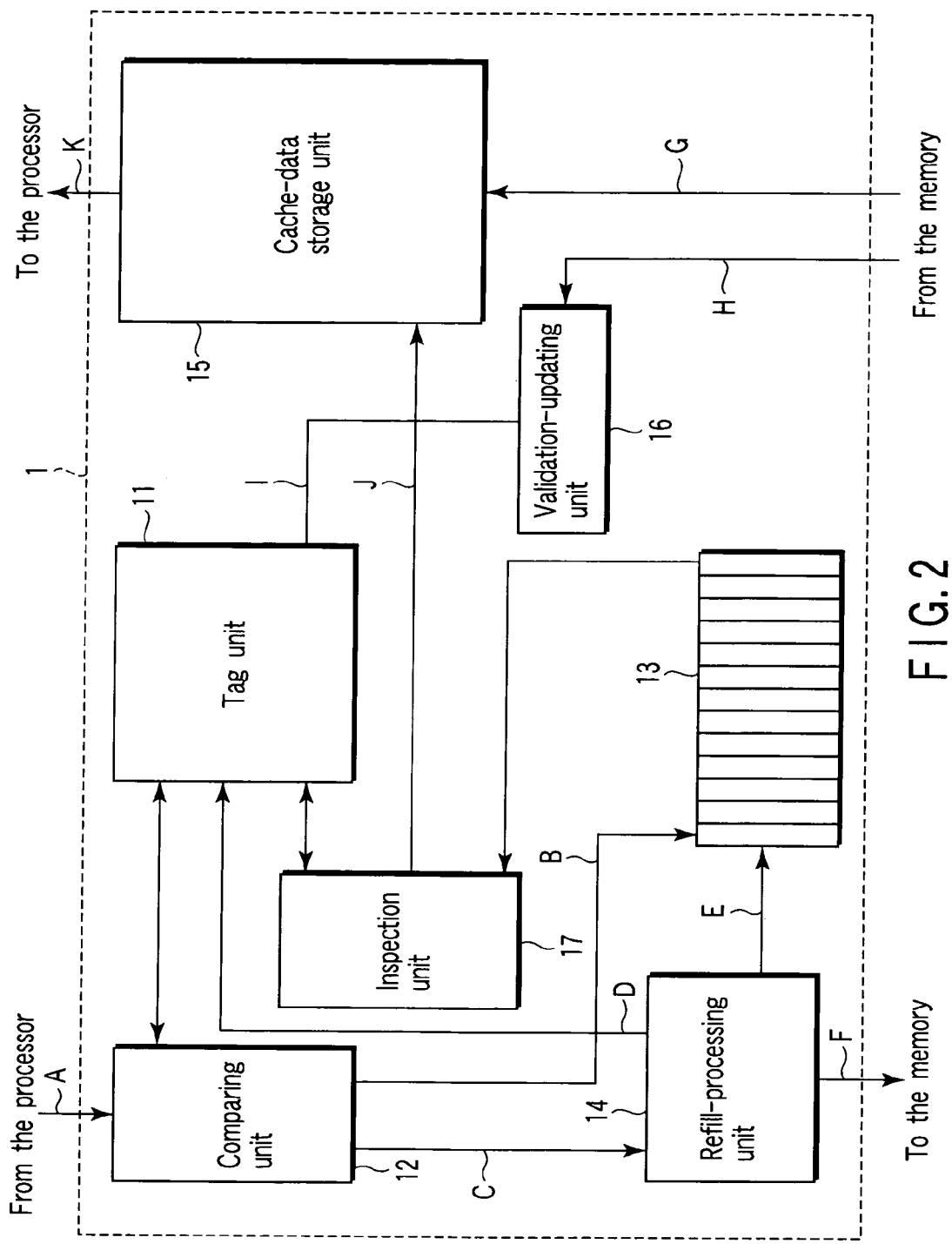
FIG. 2 is a block diagram illustrating the major components of the cache system according to the embodiment.

FIG. 2 is a block diagram illustrating the major components of the cache system 1. The cache system 1 has a tag unit 11, a comparing unit 12, an ID-number storage unit 13, a refill-processing unit 14, a cache-data storage unit 15, a validation-updating unit 16, and an inspection unit 17.

The tag unit (management-data storage) 11 is implemented in, for example, a nonvolatile memory. It is constituted by a table shown in FIG. 3. FIG. 3 represents the configuration of the tag unit 11. As FIG. 3 shows, the table contains various ID numbers (entries) and various items in association with the ID numbers, respectively. Each ID number is assigned to one unit memory region in the memory space of the cache-data storage unit (data storage) 15 and is equivalent to the address of the unit memory region. Hence, an ID number designates one unit memory region of the cache-data storage unit 15.

As many ID numbers are available at most, as the memory regions provided in the cache-data storage unit 15. Each ID number consists of a number of bits (e.g., 6 bits) that suffices to distinguish the ID number from any other.

As FIG. 3 shows, at least a read address (e.g., 32 bits) and a validation bit are stored in the tag unit 11, for each ID number. The read address is an address in the main memory 3, at which the data demanded by the processor 2 is stored. The read addresses stored in the tag unit 11 are the addresses in the memory region 42 of the main memory 3, from which the data items designated by the ID numbers can be read out.

As will be described later, one ID number is assigned to a read address when the data of the read address is written in the cache-data storage unit 15. This read address is written in the address column of the tag unit 11, in association with the ID number assigned.

Validation bits are stored in the validation column of the tag unit 12. Each validation bit shows whether or not data (read data) designated by the read address has been written in the unit memory region, which is specified by the ID number in the cache data block 15. For example, the validation bit indicates that the read data has been written if it is "1," and that the read data has not been written if it is "0."

The comparing unit 12 receives an address A that the processor 2 has output. The comparing unit 12 refers to the tag unit 11 and determines whether or not the read data is stored in the cache-data storage unit 15. (That is, the pre-fetching is carried out.) In other words, the comparing unit 12 searches the tag unit 11 for the read address.

If the read address is registered in the tag unit 11 (if a hit is made), the comparing unit 12 supplies the ID number of the read address (i.e., signal B containing the information about the ID number) to the ID-number storage unit 13. It suffices if the ID-number storage unit 13 is configured to store the ID number. Therefore, its circuit configuration is simpler than in the case where the read address must be held until the fetching is carried out as in the conventional cache system.

The ID-number storage unit 13 is, for example, a shift register. It sequentially outputs the ID numbers it has received in sequence, in the first-in, first-out (FIFO) mode. Alternatively the ID-number storage unit 13 may output any ID number upon lapse of a predetermined time after it has received the ID number.

If the read address is not registered in the tag unit 11 (if a hit is not made), the comparing unit 12 supplies a signal C to the refill-processing unit 14. The signal C contains the read address and a request for the read data.

On receiving the signal C, the refill-processing unit 14 performs a process to acquire the read data from the main memory 3. More specifically, the refill-processing unit 14 determines in which unit memory region the read data should be stored in the cache-data storage unit 15. That is, the refill-processing unit 14 sets the read data and the ID number in one-to-one relation. Then, the unit 14 supplies a signal D to the tag unit 11 so that a read address may be written in the read-address column for the ID number of the unit memory region determined.

The unit memory regions provided in the cache-data storage unit 15 are uniquely identified by ID numbers. Hence, the unit memory region in which the read data should be stored can be identified by the ID number only.

The refill-processing unit 14 supplies a signal E to the ID-number storage unit 13. The signal contains the ID number (designated ID number) of the unit memory region in which the read data should be stored.

The refill-processing unit 14 supplies a signal F to the main memory 3. The signal F contains the read address at which desired read data is stored in the main memory 3, the request to send the read data and the designated ID number.

In the main memory 3, the memory controller 41 receives the signal F and temporarily stores the ID number allocated to the read address. The memory controller 41 reads the read data at the read address in the memory region 42. The memory controller 41 then supplies the read data and a signal G to the cache-data storage unit 15. In the cache-data storage unit 15, the read data is stored in the unit memory region identified by the allocated ID number.

The memory controller 41 outputs not only the read data, but also a signal H when outputting the signal G. The signal H contains the ID number (read-data ID number) that designates the unit memory region in which the read data should be stored.

The signal H containing the read-data ID number is supplied to the validation-updating unit 16. The validation-updating unit 16 supplies a signal I to the tag unit 11. The signal I contains information showing that the data identified by the read-data ID number has been stored. On receiving this information, the tag unit 11 changes the validation information for the read-data ID number to show that it is now valid.

The cache-data storage unit 15 is a device into and from which data can be written and read at high speed. It is, for example, a static random access memory (SRAM).

The inspection unit 17 receives an ID number from the ID-number storage unit 13. The inspection unit 17 determines whether the validation-displaying column of the ID number shows that the validation information is valid. If the validation information is valid, the inspection unit 17 outputs a signal J. The signal J shows that the data in the unit memory region corresponding to the ID number should be output. On receiving the signal J, the cache-data storage unit 15 outputs read data K from the unit memory region that corresponds to the ID number.

The comparing unit 12 needs to compare any read address supplied to it, with the read addresses registered in the tag unit 11. It must have a relatively large circuit configuration. By contrast, the inspection unit 17 can be simpler in circuit configuration than the comparing unit 12. This is because the ID number consists of far less bits than the read address.

Figure 4:
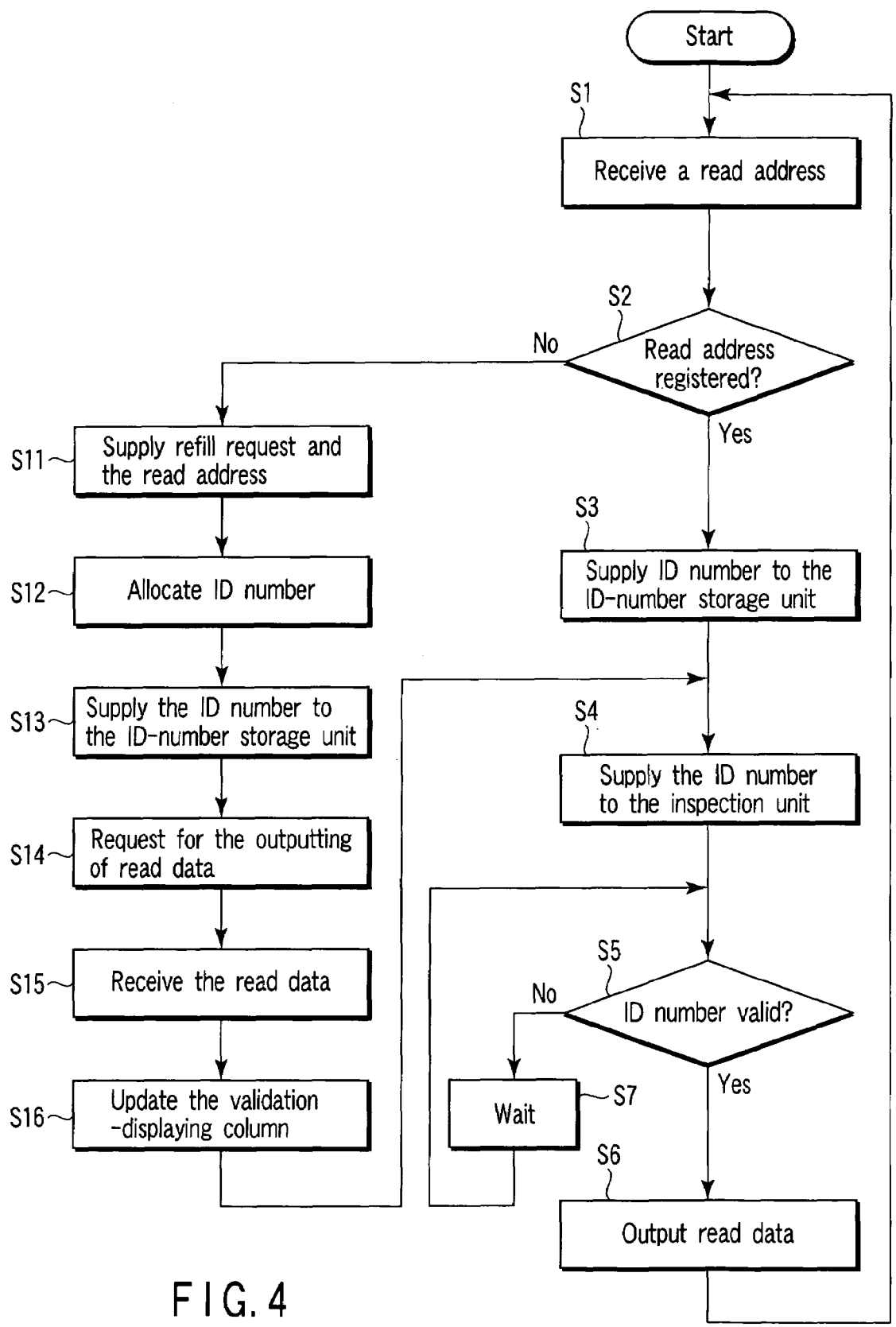
FIG. 4 is a flowchart illustrating how the cache system according to the embodiment operates.

How the cache system according to the embodiment operate will be described with reference to the flowchart of FIG. 4. As FIG. 4 shows, the processor 2 supplies a read address to the cache system 1 (Step S1). In the cache system 1, the comparing unit 12 searches the tag unit 11, determining whether the read address is registered in the tag unit 11 (Step S2).

If the read address is registered (if a hit is made), that is, if the read data is stored in the cache-data storage unit 15, the comparing unit 12 supplies the ID number of the read address to the ID-number storage unit 13 (Step S3).

The ID-number storage unit 13 supplies a read-request address to the inspection unit 17, upon lapse of a predetermined time from the supply of this read-request address (Step S4). Alternatively, the ID-number storage unit 13 supplies the address supplied first, to the inspection unit 17, due to the FIFO scheme, when it receives the read-request address.

The inspection unit 17 inspects the validation-displaying column of the ID number supplied from the ID-number storage unit 13 (Step S5). If the column shows that the validation information is valid, the inspection unit 17 outputs a signal to the cache-data storage unit 15. This signal indicates that the data stored in the unit memory region of the ID number should be output. On receiving the signal, the cache-data storage unit 15 supplies to the processor 2 the data (i.e., read data) of the address corresponding to the ID number.

In Step S5, the column may not show that the validation information is valid. In this case, the comparing unit 12 stores the ID number and waits for a predetermined time (Step S7). Upon lapse of this time, the process returns to Step S5, in which the inspection unit 17 inspects the validation-displaying column again. Thus, Steps S5 and S7 are repeated until the column comes to show that the validation information is valid (that is, until the read data is refilled in the cache-data storage unit 15).

Note that the validation-displaying column of the read address usually shows that the validation information is valid if the read data exits in the cache-data storage unit 15. Hence, the process rarely goes to Step S7.

If the comparing unit 12 determines in Step S2 that the read address is not registered in the tag unit 11 (that is, no hits are made), the process goes to Step S11. In Step S11, the comparing unit 12 supplies a refill request and the read address to the refill-processing unit 14.

The refill-processing unit 14 designates a unit memory region in which the read address should be stored (Step S12). In other words, the refill-processing unit 14 allocates an ID number (allocated ID number) to the read data. The refill-processing unit 14 does not use, as such a unit memory region, that unit memory region of the ID-number storage unit 13, in which the ID number is stored. This prevents the read data from being overwritten before it is supplied to the processor 2.

The refill-processing unit 14 writes the read address in the address-displaying column of the ID number in the tug unit 11. At the same time, the refill-processing unit 14 invalidates the validation-displaying column of the ID number.

Then, the refill-processing unit 14 supplies the ID number, thus designated, to the ID-number storage unit 13 (Step S13). Further, the unit 14 supplies the ID number, together with a signal requesting that the read data be output to the main memory (Step S14). Note that Step S13 and Step S14 may be performed other way around, or in parallel.

Upon lapse of a time predetermined on the basis of the processing ability of the main memory 3, the read data is supplied, together with its ID number, from the main memory 3 to the cache system 1 (Step S15).

The ID number supplied from the main memory 3 is supplied to the validation-updating unit 16. The validation-updating unit 16 rewrites the validation-displaying column of the ID number, which is registered in the tag unit 11, into one that shows that the validation information is valid (Step S16). Thereafter, the process returns to Step S4.

In the cache system according to an embodiment of the present invention, ID numbers are allocated to the unit memory regions of the cache-data storage unit 15. Thus, each read data is identified by the ID number, in accordance with in which unit memory region it should be stored. The comparing unit 12 determines whether the validation-displaying column provided for the ID number shows that the validation information is valid in order to determine whether the read data is stored in the cache-data storage unit 15 when fetching. It is therefore easier to determine whether the read data is already stored, than by comparing the read address with those registered in the tag unit 11. Hence, the inspection unit 17 occupies but a smaller area than the circuit that is conventionally used to compare the read address with those registered in a tag unit 11.

Moreover, the ID-number storage unit 13 needs to hold ID numbers each of which consists of a few bits, because each read data is identified by an ID number. The ID-number storage unit 13 can therefore be more simple than in the case it must hold read addresses. Hence, the ID-number storage unit 13 occupies but a small area.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cache system that acquires data of an address requested by a processor from a main memory, temporarily stores the data and supplies the data to the processor, the cache system comprising:

a cache-data storage which stores the data, which the main memory supplies, in memory regions of the cache-data storage, a unique identification number being assigned to each of the memory regions of the cache-data storage, each one of the identification numbers being assigned to only one of the memory regions of the cache-data storage;

a management data storage which stores a relation between each of the identification numbers assigned to the memory regions of the cache-data storage and an address in the main memory of data stored or being stored in the memory region of the cache-data storage corresponding to the identification numbers and stores validation information related to each of the identification numbers, wherein the validation information indicates whether data associated with the validation information is stored in the cache-data storage;

a refill-processing unit which designates, from the memory regions of the cache-data storage, a first memory region in which the data of a new address of main memory supplied from the processor is to be stored and requesting to the main memory to output the data of the new address;

an inspection unit which receives the identification number of the first memory region of the cache-data storage designated, determines whether the validation information related to the identification number assigned to the first memory region of the cache-data storage designated is valid, and requesting the cache-data storage to output the data stored in the first memory region of the cache-data storage designated when the validation information is valid;

an identification number storage which receives the identification number assigned to the first memory region designated from the refill-processing unit and which supplies the identification number assigned to the first memory region to the inspection unit upon lapse of a predetermined time; and a comparing unit which searches the management data storage and supplies, when data of the new address is stored, the identification number assigned to the first memory region in which the data of the new address is stored to the identification number storage.

2. The cache system according to claim 1, wherein the inspection unit supplies the new address of main memory to the refill-processing unit when the inspection unit searches the management data storage and determines that the cache-data storage stores no data of the new address.

3. The cache system according to claim 1, further comprising a validation-updating unit which receives the identification number assigned to of the first memory region designated and which supplies to the management data storage a signal that invalidates the validation information related to the identification number assigned to of the first memory region designated when the data of the new address is stored in the first memory region of the cache-data storage.

4. The cache system according to claim 1, wherein when the refill-processing unit receives the new address, the memory region that stores the data of the new address remains to be used until the data of the new address is output from the cache-data storage.

* * * * *